(12) United States Patent  
Schwenter et al.

(10) Patent No.: US 12,529,587 B2  
(45) Date of Patent: Jan. 20, 2026

(54) PROCESS MONITORING DEVICE

(71) Applicant: Endress+Hauser Flowtec AG, Reinach (CH)

(72) Inventors: Benjamin Schwenter, Ettingen (CH); Robert Lalla, Lörrach (DE); Samuel Neeser, Aesch (CH); Martin Josef Anklin, Dornach (CH); Ennio Bitto, Aesch (CH); Ruben Kiefer, Ettingen (CH); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 209 days.

(21) Appl. No.: 18/256,279

(22) PCT Filed: Nov. 26, 2021

(86) PCT No.: PCT/EP2021/083174  
§ 371 (c)(1),  
(2) Date: Jun. 7, 2023

(87) PCT Pub. No.: WO2022/122418  
PCT Pub. Date: Jun. 16, 2022

(65) Prior Publication Data  
US 2024/0027248 A1    Jan. 25, 2024

(30) Foreign Application Priority Data  
Dec. 8, 2020    (DE) .................... 10 2020 132 685.8

(51) Int. Cl.  
*G01F 1/84*    (2006.01)

(52) U.S. Cl.  
CPC .......... *G01F 1/8418* (2013.01); *G01F 1/8409* (2013.01); *G01F 1/8486* (2013.01)

(58) Field of Classification Search  
None  
See application file for complete search history.

(56) References Cited

U.S. PATENT DOCUMENTS 6,748,813 B1 *    6/2004    Barger .................. G01F 1/8472  
                                                         73/861.354  
7,484,345 B2 *    2/2009    Woods .................... B65B 59/04  
                                                         53/284.7

(Continued)

FOREIGN PATENT DOCUMENTS

DE    102006013826 A1    9/2007  
DE    102016008655 A1    1/2018

(Continued)

*Primary Examiner* — Mark A Shabman  
(74) *Attorney, Agent, or Firm* — Christopher R. Powers; Endress+Hauser (USA) Holding, Inc.

(57) ABSTRACT

A process monitoring device includes: a measuring tube module having at least one measuring tube through which a medium can flow; a receptacle module having a receptacle, wherein the measuring tube module can be inserted into the receptacle, wherein the measuring tube module can be mechanically separably connected to the receptacle module; and a system for biotechnological applications, wherein the system has a housing, wherein the housing has a housing wall, which delimits a housing interior, wherein the housing wall has a cover, wherein the cover has an opening, wherein the receptacle module, in particular the receptacle, extends through the opening into the housing interior.

8 Claims, 3 Drawing Sheets

(56) References Cited

U.S. PATENT DOCUMENTS

| | | | |
|---|---|---|---|
| 10,209,113 B2 | 2/2019 | Young et al. | |
| 2003/0097884 A1* | 5/2003 | Sund .................... | G01F 1/8495 |
| | | | 73/861.355 |
| 2003/0225538 A1* | 12/2003 | Baker .................. | G01F 1/8413 |
| | | | 702/104 |
| 2007/0234822 A1* | 10/2007 | Bitto .................... | G01F 1/8413 |
| | | | 73/861.355 |
| 2013/0124131 A1* | 5/2013 | Murakami ............. | G01F 25/10 |
| | | | 702/100 |
| 2015/0323486 A1* | 11/2015 | Schick ............... | G01N 27/4167 |
| | | | 204/403.02 |
| 2020/0116612 A1* | 4/2020 | Ruetten ................ | G01F 1/8431 |
| 2020/0319006 A1 | 10/2020 | Malani et al. | |

FOREIGN PATENT DOCUMENTS

| | | |
|---|---|---|
| DE | 102017128565 A1 | 6/2019 |
| DE | 102018119887 A1 | 2/2020 |
| DE | 102019134604 A1 | 6/2021 |
| EP | 1954565 B1 | 10/2012 |
| WO | 2011099989 A1 | 8/2011 |
| WO | 2018114755 A1 | 6/2018 |

* cited by examiner

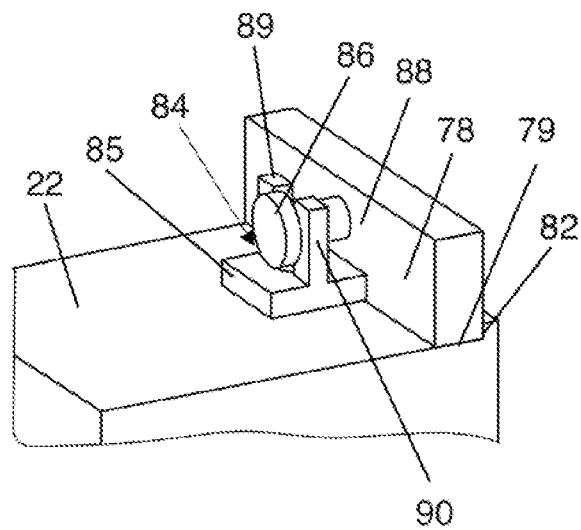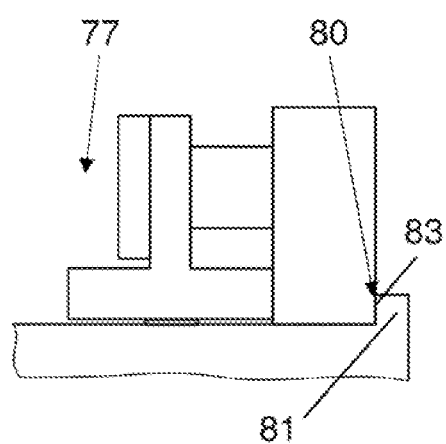
Fig. 3A Fig. 3B
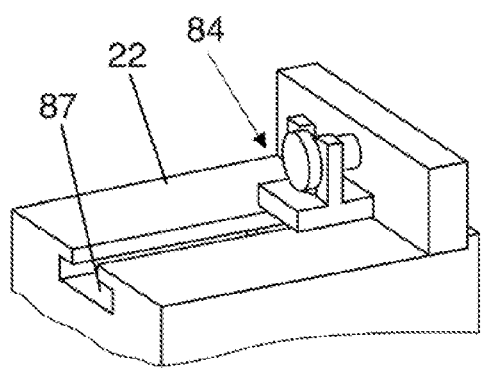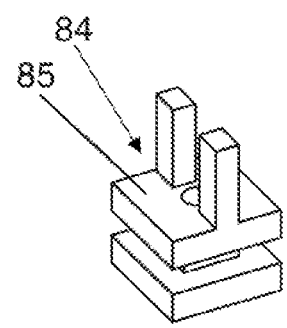
Fig. 4 Fig. 5

PROCESS MONITORING DEVICE

CROSS-REFERENCE TO RELATED APPLICATIONS

The present application is related to and claims the priority benefit of German Patent Application No. 10 2020 132 685.8, filed on Dec. 8, 2020, and International Patent Application No. PCT/EP2021/083174, filed Nov. 26, 2021, the entire contents of which are incorporated herein by reference.

TECHNICAL FIELD

The invention relates to a process monitoring device for pharmaceutical bioprocess applications.

BACKGROUND

Systems for bioprocess applications, such as bioreactors or crossflow systems, serve the purpose of receiving, storing and/or mixing biological media, which include fluids and/or solids. The biological media are usually provided in disposable containers and/or bags and are placed into a housing of the system for bioprocess applications, where they are stored, temperature-controlled and/or mixed. In such a system for bioprocess applications, the process properties of the biological media are investigated and/or monitored with different sensors. One or more sensors can be arranged in the system for bioprocess applications to carry out measurements on the medium in the disposable container or in the hose system, such as temperature or pH measurements. In this case, the sensor is arranged on an outer surface of the housing of the system for bioprocess applications such that a portion of the sensor which contacts the medium passes through the housing wall of the system for bioprocess applications into the container and into the medium. Alternatively, the sensors can be integrated into a hose system which is configured to remove the medium from the container. This hose system is usually arranged on the outer surface of the housing. Depending on the application, the handling of the system for bioprocess applications takes place in a sterile environment or under clean-room conditions.

DE 10 2016 008 655 A1 discloses a system for biotechnological applications, in particular a bioreactor, which has system rails or carriers on the peripheral surface of the housing for the purpose of attaching hoses and sensors to the outside of the housing. Furthermore, triclamps are disclosed as fastening means.

Coriolis flow meters are typically used in process-automated industrial systems in conduits, via connecting devices such as flanges, connectors, etc. An example of this is a filling station for liquid or gaseous substances as disclosed in DE 10 2006 013 826 A1, or a process line as disclosed in DE 10 2017 128 565 A1.

Coriolis flow meters with interchangeable disposable measuring tube modules, which are suitable for single-use applications, are also known. For example, WO 2011/099989 A1 discloses a method for producing a monolithically formed measuring tube module of a Coriolis flow meter, having bent measuring tubes, wherein the measuring tube body of the respective measuring tubes is at first formed as a solid made of a polymer, and the channel for conveying the flowing medium is subsequently machined into said solid. WO 2011/099989 A1 teaches, like U.S. Pat. No. 10,209,113 B2, a modular design of the Coriolis flow meter, whereby an exchange of the part of the measuring device that contacts the medium is made possible. To this date, nothing is known regarding the integration of the Coriolis flow meter into process monitoring systems for pharmaceutical bioprocess applications.

The object of the invention is to remedy this.

SUMMARY

The object is achieved by the process monitoring device according to the present disclosure.

The process monitoring device according to the invention, preferably for pharmaceutical bioprocess applications, comprising:
  a measuring tube module,
    wherein the measuring tube module comprises at least one measuring tube through which a medium can flow,
    wherein the measuring tube module has a first vibration exciting component of at least one vibration exciter configured to excite vibrations in the measuring tube module, in particular the at least one measuring tube,
    wherein the measuring tube module has a first vibration sensor component of at least one vibration sensor designed to detect the vibrations of the at least one measuring tube;
  a receptacle module,
    wherein the receptacle module has a receptacle,
    wherein the measuring tube module can be inserted into the receptacle,
    wherein the measuring tube module can be mechanically separably connected to the receptacle module,
    wherein the receptacle module has a second vibration exciting component of the at least one vibration exciter,
    wherein the receptacle module has a second vibration sensor component of the at least one vibration sensor; and
  a system for biotechnological applications,
    wherein the system has a housing,
    wherein the housing has a housing wall which delimits a housing interior,
    wherein the housing wall has a cover,
    wherein the cover has an opening,
    wherein the receptacle module, in particular the receptacle, extends through the opening into the housing interior.

The arrangement according to the invention of the receptacle module has the advantage that a compact design of the process monitoring device is made possible and external mechanical disturbances of the flow measurement are minimized. The compact design additionally leads to the ascertained measured values, such as temperature, differing only insignificantly between any sensors used, so that the use of a measuring tube module in conjunction with a receptacle module for determining a measured variable dependent on the mass flow of the flowing medium has the advantage of providing an alternative to the scales typically used in pharmaceutical bioprocess applications for determining the quantities of the medium used. The housing preferably has a metallic housing wall, which is preferably designed as a sheet metal part. The receptacle module body is formed from steel as a solid component in order to allow the measuring tubes to vibrate with as little interference as possible.

Advantageous embodiments of the invention are the further subject matter of the present disclosure.

One embodiment provides that the receptacle module has a portion,
wherein the portion is located outside the housing interior,
wherein the receptacle module, in the portion, has a shoulder, which is in particular circumferential,
wherein the cover has a cover surface,
wherein the shoulder has a shoulder surface,
wherein the shoulder surface and the cover surface face one another.

By providing a shoulder on the receptacle module, a counter surface is created for fastening the receptacle module via the fastening arrangement arranged in the housing, preferably on the inner side. A sealing means is preferably arranged between the shoulder surface and the cover surface to seal the receptacle module and prevent the entry of liquids into the housing interior when the system is cleaned.

One embodiment provides that the receptacle extends in a receiving direction,
wherein the receptacle module is arranged in the opening in such a way that the receiving direction has a vectorial portion with a direction opposite to the direction of gravity.

The special arrangement has the advantage that the measuring tubes are thus self-emptying. Due to the inclination of the receptacle relative to a horizontal reference axis, the medium located in the measuring tube flows out. The inclination is oriented in accordance with the ASME BPE GSD1 to GSD3 standard (2019).

One embodiment provides that the receptacle module comprises a fastening arrangement,
wherein the fastening arrangement is arranged in the housing interior,
wherein the fastening arrangement is configured to mechanically connect the receptacle module to the cover.

The advantage of this embodiment is that it ensures better cleanability from outside the housing when the fastening arrangement is located exclusively in the housing interior. No further openings in the cover means fewer places where moisture can enter the housing interior.

One embodiment provides that the fastening arrangement comprises a first fastening means,
wherein the first fastening means is connected to the receptacle module, in particular movably in a guide,
wherein the fastening arrangement comprises a second fastening means,
wherein the first fastening means is functionally connected to the second fastening means.

One embodiment provides that the cover has a rear side,
wherein the second fastening means is configured to at least partially bend the first fastening means, preferably opposite to the rear side.

One embodiment provides that the system comprises a single-use system, in particular a bioreactor, a system for chromatographic purification processes, a crossflow system, or the like.

A bioreactor and/or fermentation reactor is a vessel in which biological processes run, and/or certain cultures are cultured in a medium, under controlled conditions defined in advance. The use of a bioreactor is an important part of pharmaceutical bioprocess technology. The vessels can be arranged in a housing, and the process properties of the medium can be monitored by means of sensors.

The term "chromatography" is used to mean a process which allows the separation of a substance mixture on the basis of the different distribution of its individual constituents between a stationary and a mobile phase. Chromatography is used, for example, during production for the purpose of purifying substances, in particular, in the production of biopharmaceuticals. Crossflow filtration is a further method for filtering media.

One embodiment provides that at least the measuring tube module and the receptacle module form a modular Coriolis flow meter.

It is known that Coriolis flow meters can have very high measurement accuracy and can also provide information on the viscosity and the density of the medium to be conveyed, in addition to the mass flow. This is not possible with conventional weight scales.

BRIEF DESCRIPTION OF THE DRAWINGS

The invention is explained in greater detail with reference to the following figures. In the drawings:

FIGS. 3A-3B show a partially cutaway interior view of the process monitoring device having a first embodiment of the fastening arrangement, and a side view of the first embodiment of the fastening arrangement;

FIG. 4 shows a partially cutaway interior view of the process monitoring device having a second embodiment of the fastening arrangement; and FIG. 5 shows a perspective view of the first fastening means of the second embodiment of the fastening arrangement.

DETAILED DESCRIPTION

Figure 1:
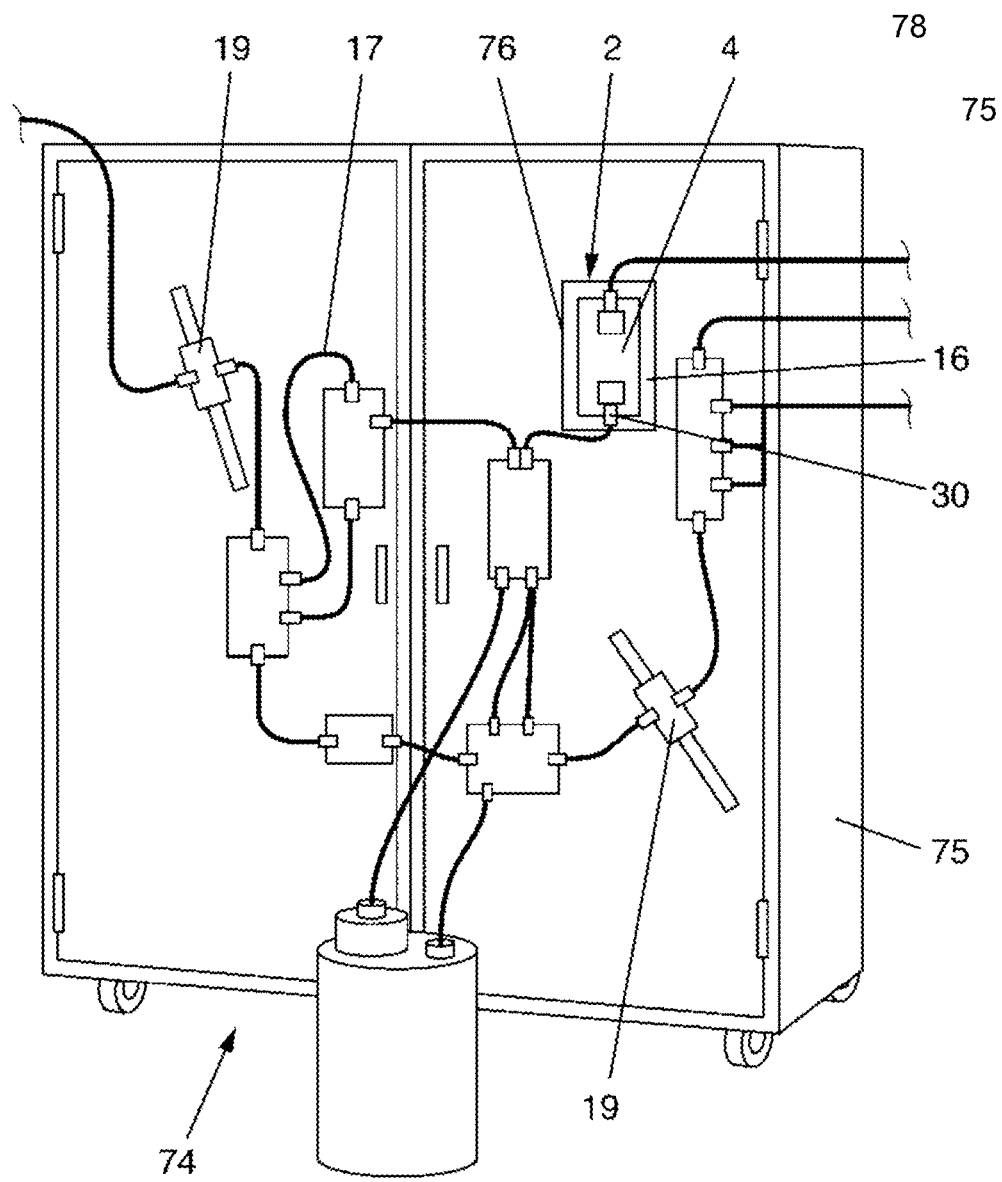
FIG. 1 shows a process monitoring device according to the present disclosure.

FIG. 1 shows a process monitoring device according to the invention for pharmaceutical bioprocess applications in a system for biotechnological applications 74. A measuring tube module 4 and a receptacle module 16 together form a Coriolis flow meter 2. The measuring tube module 4 has at least one measuring tube 3 through which a medium can flow, and is configured as an exchangeable component of the Coriolis flow meter 2. For this purpose, it preferably has no electronic components that have to be supplied by means of a voltage source via an electrical contact. The measuring tube module 4 has a first vibration exciting component of at least one vibration exciter configured to excite vibrations in the measuring tube module 4, in particular the at least one measuring tube 3. In addition, the measuring tube module 4 has a first vibration sensor component of at least one vibration sensor configured to detect the vibrations of the at least one measuring tube 3. The first vibration exciting component and the first vibration sensor component are preferably magnets. Furthermore, the measuring tube module 4 has process connections 30 which are simultaneously designed as distributor pieces.

The receptacle module 16 is a fixed component of the system for biotechnological applications and has the electronic components with which the Coriolis flow meter 2 is operated and the flow-dependent measurement signal is detected. The receptacle module 16 has a receptacle 23 for the measuring tube module 4, into which the measuring tube module 4 can be inserted. In addition, the measuring tube module 4 can be mechanically separably, or detachably, connected to the receptacle module 16 in order to ensure a user-friendly exchange of the measuring tube module 4. When the application is changed, the measuring tube module 4 can be replaced with a new sterilized measuring tube module 4. The receptacle module 16 has a second vibration exciting component of the at least one vibration exciter and a second vibration sensor component of the at least one vibration sensor. These are the excitation coil and the at least one sensor coil, which are each electrically connected to a measuring circuit and are controlled and read, respectively, via the circuit. The receptacle module 16 is not designed to contact the medium but is configured such that it can be cleaned.

The system 74 for biotechnological applications has a housing 75 with a housing wall 76 which delimits a housing interior. The housing wall 76 is made of sheet metal. The receptacle module 16 is arranged in an opening of the housing wall 76. The receptacle module 16, in particular the receptacle of the receptacle module 16, extends through the opening 79 into the housing interior. The receptacle module 16 is fastened through the housing interior (see FIGS. 3 to 6). The receptacle module 23 can be arranged in the opening 79 in such a way that the receiving direction, which is defined by the direction of the extension of the receptacle module, has a vectorial portion with a direction opposite to the direction of gravity. The system 74 may comprise a bioreactor, a system for chromatographic purification processes, a crossflow system, or the like.

Figure 2A:
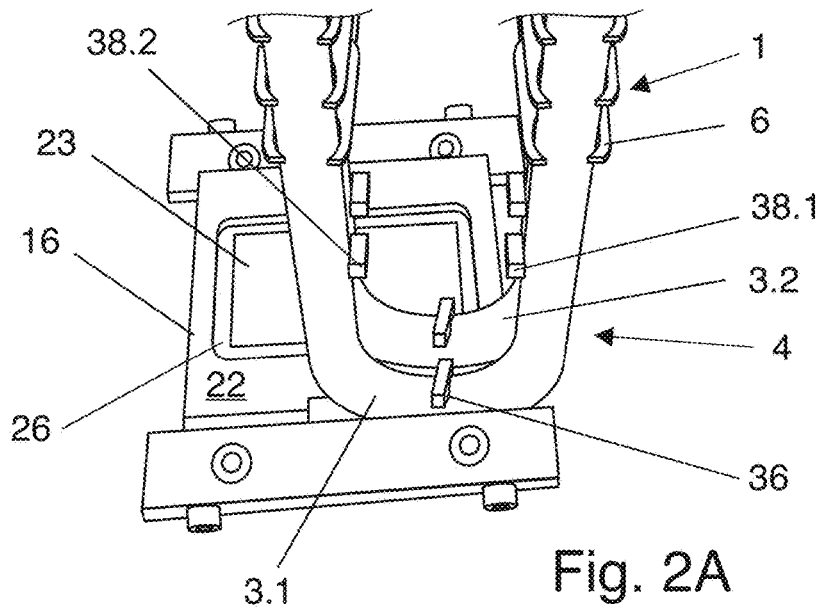
FIGS. 2A-2C show three views of a measuring tube module and receptacle module.
Figure 2B:
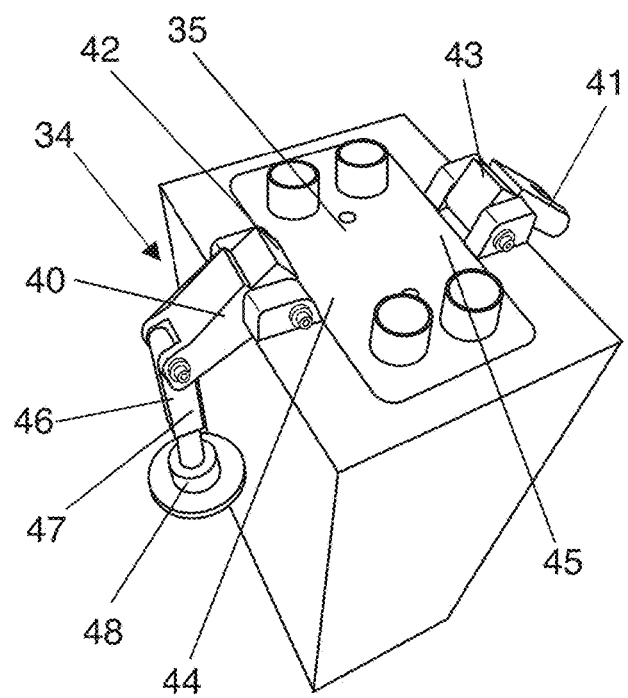
Figure 2C:
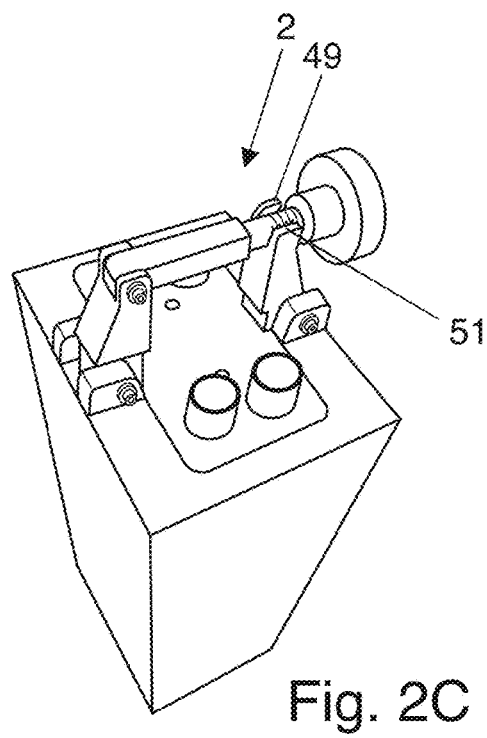

FIGS. 2A-C show an image series of individual assembly steps of a measuring device 2 according to the invention. The measuring tube module 4 comprises two measuring tubes 3.1, 3.2, which are mechanically coupled to one another via a coupler arrangement 1. In the illustrated embodiment, the coupler arrangement 1 comprises six coupler elements 6, which partially encompass the two measuring tubes 3.1, 3.2. The measuring tube module 4 is designed as a disposable article and can be mechanically detachably arranged in and fastened to a provided receptacle module 16. The two measuring tubes 3.1, 3.2 each comprise a measuring tube body, which is formed at least partially from steel. An excitation magnet 36 and two sensor magnets 38.1, 38.2 are attached to each of the measuring tube bodies. The receptacle module 16 has a receptacle 23 which extends from a front face of the receptacle module body 22 in the longitudinal direction thereof. In addition, the receptacle module body 22 of the receptacle module 16 has a mounting surface 26 on which the measuring tube module 4, in particular the fixing body arrangement 35, rests in the installed state, and which is designed in such a way that the measuring tubes 3.1, 3.2 of the measuring tube module 4 do not contact the wall of the receptacle module 16. The mounting surface 26 surrounds the receptacle 29 in a cross-section so that when the measuring tube module 4 is arranged, an entire edge region of the fixing body arrangement 35 rests on the mounting surface 26. The two excitation coils of the vibration exciter and the four sensor coils of the vibration sensor (not shown) are arranged in an inner peripheral surface of the receptacle module 16, in particular distributed on two diametrically oriented lateral surfaces of the receptacle 23. The excitation coils and vibration coils are preferably embedded in the receptacle module body 22 so that they are not damaged when the measuring tube module 4 is inserted.

In the installed state, the measuring tube module 4 is arranged in the receptacle 23 and the fixing body arrangement 35 rests on the mounting surface 26. The measuring tube module 4 is now ready to be fastened to the receptacle module 16 by means of the fixing device 34. This is necessary so that a measurement with a stable zero point is possible. For this purpose, the fixing device 34 has a first fixing element 40 and a second fixing element 41, which are each designed to be pivotable and each have a fixing surface 42, 43. The fixing surfaces 42, 43 are each located at a first end of the fixing element 40, 41. The fixing elements 40, 41 each have an elongate fixing element body. In the end portion comprising the first end, the fixing elements 40, are fastened to the receptacle module body 22 in a manner allowing pivoting about an axis of rotation. The fixing elements 40, 41 are configured to press the fixing body arrangement 44 against the mounting surface 26 in order to thus suppress movements of the fixing body arrangement. The first fixing element 40 is connected to a pivotable connecting device 46, which comprises a connecting body 47. The connection between the fixing element 40 and the pivotable connecting device 46 is located at the second end of the first fixing element 40. The connecting body 47 is at least partially cubic, and cylindrical in the end portion. There, a closing device 48 is arranged on the connecting body 47. In the illustrated embodiment, the end portion of the connecting body 47 has an external thread, and the closing device 48 is designed as a screw. Depending on the application and the requirements for measurement performance, the closing device 48 can also be designed as a torque screw, a clamping lever, a clamping bracket, a tensioner, a quick clamp, a tensioning lever, a clamping claw, a hood closure, and/or an eccentric lever. Alternatively (not shown), the closing device 48 can be designed as a clasp, in particular a sleeve clasp, which is arranged on a first fixing element 40 of the two fixing elements 40, 41. Accordingly, a pivot part is arranged on the second fixing element 41. In this case, the pivot part is designed as a sleeve pivot part which has at least one hook, in particular a sleeve hook. In the fixed state, the fixing surfaces 42, 43 of the fixing elements 40, 41 contact the contact surfaces 44, 45 of the fixing body arrangement 35. The connecting body 47 of the connecting device 46 is functionally connected to the second fixing element 41, i.e., the connecting device 46, in particular the connecting body 47, connects the first fixing element 40 to the second fixing element 41. The second fixing element 41 has a guide 51 at the second end for the end portion of the connecting body 47. In the closed state, the connecting body 47 extends along the guide 51 of the second fixing element 41. The closing device 48 contacts the clamping surface 49 of the second fixing element 41. When the closing device 48, in the form of a screw, is tightened, the two fixing elements are brought uniformly together. The closing device 48 presses against the clamping surface 49. Because the two fixing elements 40, 41 are designed to be pivotable about an axis of rotation, when the fixing elements 40, 41 are tightened and accordingly brought together, a force is produced on the fixing body arrangement 35 parallel to the longitudinal direction of the measuring tube module 4 in the direction of the mounting surface 26. This force ensures a uniform fastening of the measuring tube module 4 to the carrier unit body 22. The measuring tubes 3.1, 3.2 each have an inlet longitudinal axis in the inlet portion and an outlet longitudinal axis in the outlet portion, wherein a first longitudinal plane runs through the inlet longitudinal axes of the measuring tubes, wherein a second longitudinal plane runs through the outlet longitudinal axes of the measuring tubes, wherein the fixing body arrangement 35 has a second end face which is oriented opposite to the first end face, wherein the first longitudinal plane and the second longitudinal plane delimit a first surface on the second end face of the fixing body arrangement 35, wherein the inlet longitudinal axis and the outlet longitudinal axis of the first measuring tube 3.1 run in a third longitudinal plane, wherein the inlet longitudinal axis and the outlet longitudinal axis of the second measuring tube 3.2 run in a fourth longitudinal plane, wherein the third longitudinal plane and the fourth longitudinal plane delimit a second surface on the second end face, wherein in the fastening state, the fixing surfaces 42, 43 of the fixing elements 40, 41 rest, in particular exclusively, on the first surface and lie outside the second surface. Alternatively, the fixing body arrangement 35 can be formed in multiple parts, wherein one part is materially bonded to the at least one measuring tube 3.1, 3.2, and a further part is attached at least with a positive connection. This further part is designed and configured to serve as a process connection for the measuring tubes 3.1, 3.2 to a process line. For this purpose, the further part can have, for example, standardized process connections, such as flanges or threads.

FIGS. 3A and B show a partially cutaway interior view of the process monitoring device having a first embodiment of the fastening arrangement 84 for fastening the receptacle module 16 to the housing wall, in particular to the cover 78, and a side view of the first embodiment of the fastening arrangement 84. An opening 79 in which the receptacle module 16 is arranged is incorporated in the cover 78. The receptacle module 16, in particular the receptacle 23, extends through the opening 79 into the housing interior 77 of the housing. In addition to the receptacle module 16, pumps, fans, cables, hoses, electronic components, and containers for the medium can be located in the housing interior 77. Furthermore, in the receiving portion 80, the receptacle module 16 has a shoulder 81, which is in particular circumferential, with a shoulder surface 83. A cover surface 82 of the cover 78 and the shoulder surface 83 face one another and lie on one another in the installed state. The shoulder is shown schematically and is generally significantly thicker than the cover 78. The fastening is realized by means of a fastening arrangement 84 which is arranged in the housing interior 77. The fastening arrangement 84 is configured to mechanically connect the receptacle module 16 to the cover 78. For this purpose, it has a first fastening means 85 and a second fastening means 86. The first fastening means 85 is connected to the receptacle module 16 and the second fastening means 86 is connected to the first fastening means 85 such that they are functionally connected to one another. The rear side 88 of the cover 78 is in contact with the second fastening means 86, which is configured to at least partially bend the first fastening means 85, preferably opposite the rear side 88. For this purpose, the first fastening means 85 has a first leg 89 and a second leg 90, which run substantially parallel to one another and are spaced apart. In the illustrated embodiment, the second fastening means 86 comprises a screw which extends between the first leg 89 and the second leg 90 in a threaded opening. According to the embodiment shown, the first fastening means 85 is fastened to the receptacle module body 22 by means of a screw. As an alternative to the two legs, a single plate with a blind hole and a thread can also be provided. The receptacle module body 22 preferably comprises steel.

FIG. 4 shows a partially cutaway interior view of the process monitoring device having a second embodiment of the fastening arrangement 84. The second embodiment differs from the first embodiment substantially by the additional guide 87 which is incorporated in the receptacle module body 22. The shape of the first fastening means 85 allows the fastening arrangement 84 to be arranged movably in the longitudinal direction of the receptacle module 16. The guide 87 is designed as a T-shaped groove, and the body of the first fastening means 85 is designed to be complementary thereto in sections (see FIG. 5). The first fastening means 85 can likewise be connected to the receptacle module body 22 with a positive and/or non-positive connection via a screw. In this case, no openings with threads need be provided in the receptacle module body 22. Instead, the first fastening means 85 can be clamped in the guide by clamping the base body.

FIG. 5 shows a perspective view of the first fastening means 85 of the second embodiment of the fastening arrangement 84. In a cross-section, the first fastening means 85 has a T-shaped basic shape, at least in one end portion. This basic shape is designed to be complementary to the shape of the guide. The base body of the first fastening means 85 preferably comprises steel.

The invention claimed is:

1. A process monitoring device, comprising:
    a measuring tube module comprising at least one measuring tube configured to enable a medium to flow therethrough, wherein the measuring tube module includes a first vibration exciting component of at least one vibration exciter configured to excite vibrations in the at least one measuring tube, and wherein the measuring tube module includes a first vibration sensor component of at least one vibration sensor configured to detect the vibrations of the at least one measuring tube;
    a receptacle module, including a receptacle, wherein:
        the measuring tube module and the receptacle module are configured to enable the measuring tube module to be replaceably inserted into the receptacle of the receptacle module,
        the measuring tube module is configured to be mechanically separably connected to the receptacle module,
        the receptacle module includes a second vibration exciting component of the at least one vibration exciter, and
        the receptacle module includes a second vibration sensor component of the at least one vibration sensor; and
    an installation for a biotechnological process application, wherein:
        the system installation includes bioreactor vessel disposed within a cabinet,
        the cabinet includes a cabinet wall, which delimits a cabinet interior, and
        the cabinet wall includes a cover, which includes an opening,
    wherein the receptacle of the receptacle module extends through the opening into the cabinet interior of the installation, wherein the opening is configured to enable the measuring tube module to be replaceably inserted directly into the receptacle of the receptacle module.

2. The process monitoring device of claim 1, wherein:
    the receptacle module includes a receiving portion outside the cabinet interior;
    the receptacle module, in the receiving portion, includes a shoulder, which is circumferential;
    the cover includes a cover surface;
    the shoulder includes a shoulder surface; and
    the shoulder surface and the cover surface face each other.

3. The process monitoring device of claim 1, wherein the receptacle extends in a receiving direction, wherein the receptacle module is arranged in the opening such that the receiving direction includes a vectorial portion with a direction opposite to the direction of gravity.

4. The process monitoring device of claim 1, wherein the receptacle module comprises a fastening arrangement disposed in the housing cabinet interior, and wherein the fastening arrangement is configured to mechanically connect the receptacle module to the cover.

5. The process monitoring device of claim 4, wherein the fastening arrangement comprises:
   a first fastener, which is connected to the receptacle module, movably in a guide; and
   a second fastener, wherein the first fastener is functionally connected to the second fastener.

6. The process monitoring device of claim 5, wherein the cover has a rear side, and wherein the second fastener is configured to at least partially bend the first fastener in the direction of the rear side.

7. The process monitoring device of claim 1, wherein the installation further comprises, a system for chromatographic purification processes, and/or a crossflow system.

8. The process monitoring device of claim 1, wherein at least the measuring tube module and the receptacle module form a modular Coriolis flow meter.

* * * * *